(12) United States Patent
Nishimura et al.

(10) Patent No.: US 11,769,337 B2
(45) Date of Patent: Sep. 26, 2023

(54) TRAFFIC SIGNAL RECOGNITION METHOD AND TRAFFIC SIGNAL RECOGNITION DEVICE

(71) Applicants: Nissan Motor Co., Ltd., Yokohama (JP); Renault S.A.S., Boulogne-Billancourt (FR)

(72) Inventors: Toshihiko Nishimura, Kanagawa (JP); Haruo Matsuo, Kanagawa (JP)

(73) Assignees: Nissan Motor Co., Ltd., Yokohama (JP); Renault S.A.S., Boulogne-Billancourt (FR)

(*) Notice: Subject to any disclaimer, the term of this patent is extended or adjusted under 35 U.S.C. 154(b) by 0 days.

(21) Appl. No.: 17/775,521

(22) PCT Filed: Nov. 12, 2019

(86) PCT No.: PCT/IB2019/001266
§ 371 (c)(1),
(2) Date: May 9, 2022

(87) PCT Pub. No.: WO2021/094799
PCT Pub. Date: May 20, 2021

(65) Prior Publication Data
US 2022/0375233 A1 Nov. 24, 2022

(51) Int. Cl.
*G06V 20/58* (2022.01)
*G06V 10/22* (2022.01)
(Continued)

(52) U.S. Cl.
CPC .......... *G06V 20/584* (2022.01); *G06V 10/22* (2022.01); *G08G 1/0969* (2013.01); *G08G 1/09623* (2013.01)

(58) Field of Classification Search
CPC . G06V 20/584; G08G 1/096855; G08G 1/095
See application file for complete search history.

(56) References Cited

U.S. PATENT DOCUMENTS

| | | | |
|---|---|---|---|
| 8,134,480 B2 | 3/2012 | Onome et al. | |
| 2009/0303077 A1 | 12/2009 | Onome et al. | |

(Continued)

FOREIGN PATENT DOCUMENTS

| | | |
|---|---|---|
| CN | 107622683 A | 1/2018 |
| JP | 2007241469 A | 9/2007 |

(Continued)

*Primary Examiner* — Santiago Garcia
(74) *Attorney, Agent, or Firm* — Young Basile Hanlon & MacFarlane, P.C.

(57) ABSTRACT

A traffic signal recognition method and a traffic signal recognition device estimate whether or not a vehicle can be decelerated at a predetermined deceleration acceleration and can stop before a stop line based on a position of the stop line corresponding to a traffic signal located in a traveling direction of the vehicle, select the traffic signal corresponding to the stop line as a target traffic signal in a case where it is estimated that the vehicle cannot stop before the stop line, set detection area corresponding to the target traffic signal on an image obtained by capturing the traveling direction of the vehicle, and determine a display state of the target traffic signal by executing image processing on the detection area.

13 Claims, 4 Drawing Sheets

(51) Int. Cl.
    *G08G 1/0962*     (2006.01)
    *G08G 1/0969*     (2006.01)

(56) References Cited

U.S. PATENT DOCUMENTS

| | | | |
|---|---|---|---|
| 2016/0293003 A1* | 10/2016 | Ng | G08G 1/0141 |
| 2016/0328975 A1* | 11/2016 | Tokita | G06V 20/584 |
| 2017/0024622 A1* | 1/2017 | Mizutani | G06V 20/584 |
| 2017/0024623 A1* | 1/2017 | Mizutani | G06V 20/588 |
| 2017/0177955 A1* | 6/2017 | Yokota | G06V 20/56 |
| 2017/0177958 A1 | 6/2017 | Yamanoi et al. | |
| 2017/0221358 A1 | 8/2017 | Kido | |
| 2017/0337435 A1* | 11/2017 | Uliyar | G06V 30/19173 |
| 2017/0355375 A1 | 12/2017 | Ferguson et al. | |
| 2018/0154870 A1 | 6/2018 | Kurata | |
| 2018/0257615 A1* | 9/2018 | Rawashdeh | G06V 20/584 |
| 2018/0365991 A1 | 12/2018 | Yamanoi et al. | |
| 2019/0122059 A1* | 4/2019 | Zhou | G06V 10/82 |
| 2019/0130198 A1* | 5/2019 | Hayashi | B60W 30/18154 |
| 2019/0286926 A1* | 9/2019 | Miura | G06V 20/588 |
| 2020/0393264 A1* | 12/2020 | Fukazawa | G06V 10/776 |
| 2021/0064894 A1* | 3/2021 | Ikezawa | G08G 1/166 |
| 2021/0078407 A1* | 3/2021 | Kim | G01C 21/365 |
| 2021/0158700 A1* | 5/2021 | Mao | G06V 20/56 |

FOREIGN PATENT DOCUMENTS

| | | |
|---|---|---|
| JP | 2011-145892 A | 7/2011 |
| JP | 2017-138702 A | 8/2017 |
| JP | 2018-92371 A | 6/2018 |
| JP | 2019-79126 A | 5/2019 |

\* cited by examiner

TRAFFIC SIGNAL RECOGNITION METHOD AND TRAFFIC SIGNAL RECOGNITION DEVICE

TECHNICAL FIELD

The present invention relates to a traffic signal recognition method and a traffic signal recognition device.

BACKGROUND

According to Japanese Patent Laid-Open Publication No. 2011-145892, a technique is proposed in which a stop sign, a red light color or a yellow light color among display states of the traffic signal is detected from an image taken by a camera at each intersection, and in which an alarm is generated when the own vehicle approaches the stop line at a certain vehicle speed or higher.

Further, according to Japanese Patent Laid-Open Publication No. 2018-092371, a technique is proposed in which for two or more traffic signals located in front of the vehicle, in the case where the first traffic signal closest to the vehicle indicates a state in which the vehicle cannot enter and the second traffic signal ahead of the first traffic signal indicates a state in which the vehicle can enter, an alarm is output when the vehicle speed of the own vehicle exceeds a certain upper limit.

SUMMARY

However, since the technique described in Japanese Patent Laid-Open Publication No. 2011-145892 is configured to sequentially detect the display state of the traffic signal at each intersection, the technique has a problem that the generation of the alarm is delayed when the intervals between the intersections are relatively close. Further, in the case where the display of a plurality of traffic signals located in front of the vehicle is simultaneously determined by using the technique described in Japanese Patent Laid-Open Publication No. 2018-092371, since the second traffic signal is always monitored in addition to the first traffic signal, there is a problem that the computational load becomes large.

The present invention has been made in view of the above problems, and an object of the present invention is to provide a traffic signal recognition method and a traffic signal recognition device capable of recognizing traffic signals that need to be detected while suppressing an increase in computational load even when the distance between intersections is relatively short.

In order to solve the above problems, a traffic signal recognition method and a traffic signal recognition device according to an aspect of the present invention estimate whether or not a vehicle can be decelerated at a predetermined deceleration acceleration and can stop before a stop line based on a position of the stop line corresponding to a traffic signal located in a traveling direction of the vehicle, select the traffic signal corresponding to the stop line as a target traffic signal in a case where it is estimated that the vehicle cannot stop before the stop line, set detection area corresponding to the target traffic signal on an image obtained by capturing the traveling direction of the vehicle, and determine a display state of the target traffic signal by executing image processing on the detection area.

According to the present invention, it is possible to recognize traffic signals that need to be detected while suppressing an increase in computational load even when the distance between intersections is relatively short.

DETAILED DESCRIPTION

Next, embodiments of the present invention will be described in detail with reference to the drawings. In the description, the same items are designated by the same reference numerals and duplicate description will be omitted.

[Configuration of Traffic Signal Recognition Device]

Figure 1:
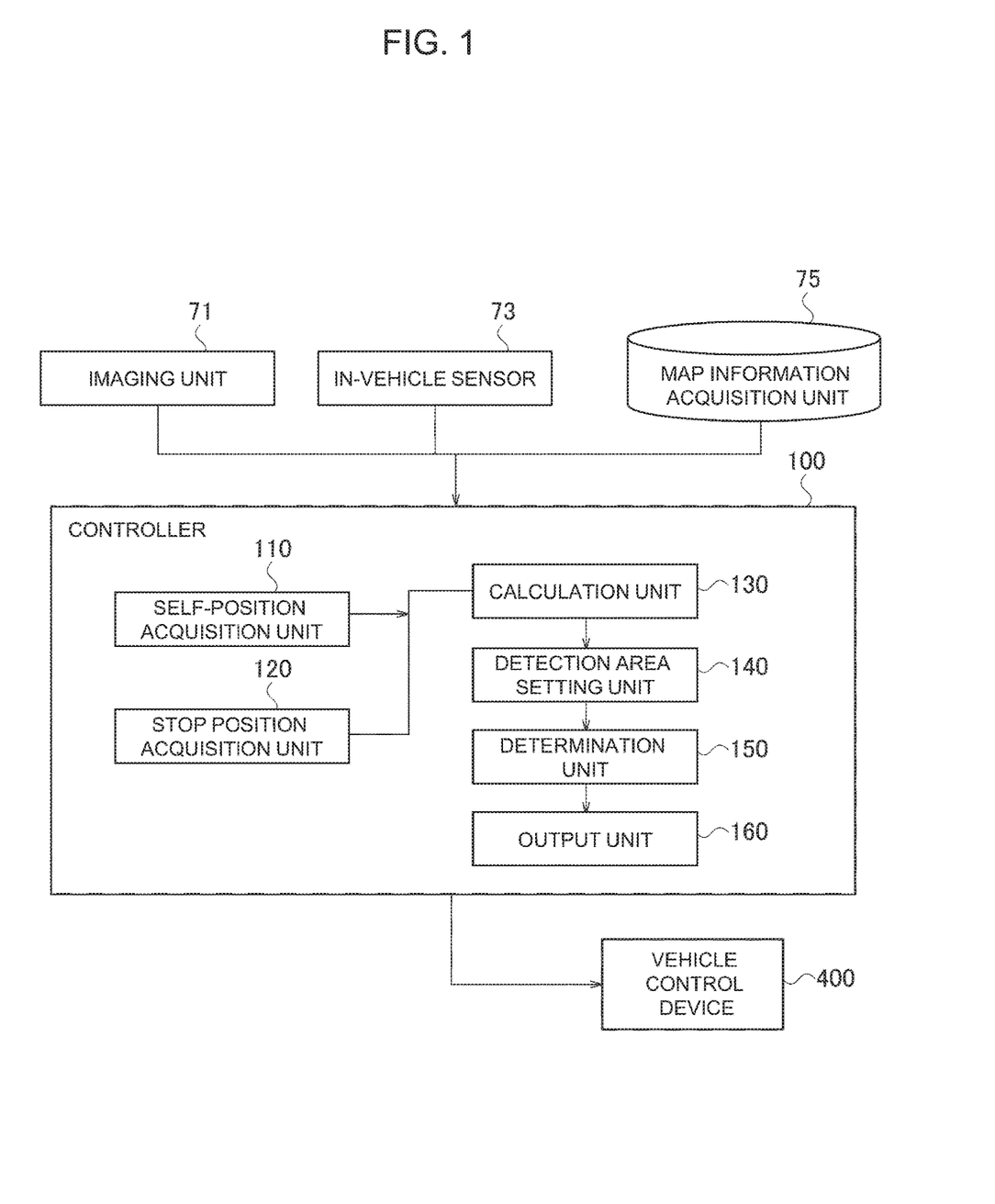
FIG. 1 is a block diagram illustrating a configuration of a traffic signal recognition device according to an embodiment of the present invention.

FIG. 1 is a block diagram illustrating a configuration of a traffic signal recognition device according to the present embodiment. As shown in FIG. 1, the traffic signal recognition device according to the present embodiment includes an imaging unit 71 and a controller 100, and the controller 100 is connected to an imaging unit 71, an in-vehicle sensor 73, a map information acquisition unit 75, and a vehicle control device 400, by a wired or wireless communication path.

Here, the imaging unit 71, the in-vehicle sensor 73, and the vehicle control device 400 are mounted on a vehicle (not shown), but the map information acquisition unit 75 and the controller 100 may be mounted on the vehicle or may be installed outside the vehicle.

The imaging unit 71 captures an image of the vehicle in the traveling direction. For example, the imaging unit 71 is a digital camera provided with a solid-state image sensor such as a CCD or CMOS, and images the surroundings of the vehicle to capture a digital image of the peripheral region of the vehicle. The imaging unit 71 images a predetermined range around the vehicle by setting the focal length, the angle of view of the lens, the vertical and horizontal angles of the camera, and the like.

The image captured by the imaging unit 71 is output to the controller 100 and stored in a storage unit (not shown) for a predetermined period of time. For example, the imaging unit 71 captures images at predetermined time intervals, and the images captured at predetermined time intervals are stored in the storage unit as past images. The past image may be deleted after a predetermined period has elapsed from the time when the past image was captured.

The in-vehicle sensor 73 includes an object detection sensor mounted on the vehicle, such as a laser radar, a millimeter wave radar, and a camera, which detects an object existing around the vehicle. The in-vehicle sensor 73 may include a plurality of different types of object detection sensors.

The in-vehicle sensor 73 detects the environment around the vehicle. For example, the in-vehicle sensor 73 may detect a moving object including another vehicle, a motorcycle, a bicycle, a pedestrian, and a stationary object including a stopped vehicle, and the position, posture, size, speed, acceleration, deceleration, and yaw rate, etc. of the moving object and the stationary object with respect to the vehicle. The in-vehicle sensor 73 may output, for example, the behavior of a two-dimensional object in a zenith view (also referred to as a plan view) viewed from the air above the vehicle as a detection result.

Further, the in-vehicle sensor 73 may detect a sign (a road sign or a sign displayed on the road surface), a guide rail, or the like existing around the vehicle. In addition, the in-vehicle sensor 73 may detect the slipperiness of the road surface in the lane in which the vehicle is traveling by detecting the rotation speed and the difference in rotation speed of the wheels provided in the vehicle.

Further, the in-vehicle sensor 73 detects the state of the vehicle in addition to the environment around the vehicle. For example, the in-vehicle sensor 73 may detect the moving speed of the vehicle (moving speed in the front-rear direction, left-right direction, turning speed), the steering angle of the wheels provided in the vehicle, and the changing speed of the steering angle.

In addition, the in-vehicle sensor 73 may measure an absolute position of the vehicle, that is, the position, attitude and speed of the vehicle relative to a given reference point, by using a position detection sensor that measures the absolute position of the vehicle, such as GPS (Global Positioning System) and odometry.

The map information acquisition unit 75 acquires map information indicating the structure of the road on which the vehicle travels. The map information acquired by the map information acquisition unit 75 includes road structure information such as absolute lane positions, lane connection relationships, and relative positional relationships. Further, the map information acquired by the map information acquisition unit 75 may include facility information such as a parking lot and a gas station. In addition, the map information may include the position information of the traffic signal, the type of the traffic signal, the position of the stop line corresponding to the traffic signal, and the like. The map information acquisition unit 75 may own a map database that stores the map information, or may acquire the map information from an external map data server by cloud computing. Further, the map information acquisition unit 75 may acquire map information by using vehicle-to-vehicle communication and road-to-vehicle communication.

The vehicle control device 400 controls a vehicle (not shown) based on the recognition result of the traffic signal obtained by the controller 100. For example, the vehicle control device 400 may drive the vehicle by automatic driving according to a predetermined traveling route, or may support the driving operation of the occupants of the vehicle. In addition, the vehicle control device 400 may be a notification device that notifies the occupants of the vehicle of the recognition result of the traffic signal.

The controller 100 (an example of a control unit or a processing unit) is a general-purpose microcomputer including a CPU (central processing unit), a memory, and an input/output unit. A computer program (traffic signal recognition program) for functioning as a traffic signal recognition device is installed in the controller 100. By executing the computer program, the controller 100 functions as a plurality of information processing circuits (110, 120, 130, 140, 150, 160) included in the traffic signal recognition device.

Here, an example is shown in which a plurality of information processing circuits (110, 120, 130, 140, 150, 160) included in the traffic signal recognition device are realized by software. However, it is also possible to configure information processing circuits (110, 120, 130, 140, 150, 160) by preparing dedicated hardware for executing each of the following information processing. Further, the plurality of information processing circuits (110, 120, 130, 140, 150, 160) may be configured by individual hardware. Further, the information processing circuit (110, 120, 130, 140, 150, 160) may also be used as an electronic control unit (ECU) used for other control related to the vehicle.

The controller 100, as a plurality of information processing circuits (110, 120, 130, 140, 150, 160), includes a self-position acquisition unit 110, a stop position acquisition unit 120, a calculation unit 130, a detection area setting unit 140, a determination unit 150, and an output unit 160.

The self-position acquisition unit 110 acquires the absolute position of the vehicle, that is, the current position of the vehicle with respect to a predetermined reference point, via the in-vehicle sensor 73. In addition, the self-position acquisition unit 110 may acquire the current speed, acceleration, and posture of the vehicle via the in-vehicle sensor 73.

The stop position acquisition unit 120 searches for the map information acquired by the map information acquisition unit 75, and extracts a traffic signal located in the traveling direction of the vehicle. Then, the stop position acquisition unit 120 acquires the position of the stop line corresponding to the extracted traffic signal from the map information. The stop position acquisition unit 120 may search for the map information acquired by the map information acquisition unit 75 based on the current position and posture of the vehicle acquired by the self-position acquisition unit 110, and may extract a traffic signal located in the traveling direction of the vehicle. Further, the stop position acquisition unit 120 may extract a traffic signal within a range that can be imaged by the imaging unit 71. Further, the stop position acquisition unit 120 may extract both a traffic signal and a stop line corresponding to the extracted traffic signal from the image captured by the imaging unit 71, and may acquire the position of the stop line corresponding to the extracted traffic signal by acquiring the position of the traffic signal and the stop line with respect to the vehicle. That is, the position of the stop line corresponding to the traffic signal can be acquired without using the position of the own vehicle or the map information, and the method of acquiring the position of the stop line corresponding to the traffic signal can be changed as appropriate.

The calculation unit 130 estimates whether or not the vehicle can decelerate at a predetermined deceleration acceleration and can stop before the stop line based on the position of the stop line acquired by the stop position acquisition unit 120. Specifically, the calculation unit 130 calculates the distance D between the current position of the vehicle and the position of the stop line for each extracted traffic signal. Then, the calculation unit 130 calculates the magnitude of the deceleration acceleration $\alpha$ when the vehicle stops at the stop line by dividing the square of the current speed V of the vehicle by twice the distance D.

That is, the magnitude of the deceleration acceleration $\alpha$ can be evaluated by the following equation (1).

$$\alpha = V^2/2D \tag{1}$$

Then, the calculation unit 130 estimates that the vehicle cannot stop before the stop line by decelerating at a predetermined deceleration acceleration $\beta$ in a case where the calculated magnitude of the deceleration acceleration $\alpha$ is larger than the magnitude of the predetermined deceleration acceleration $\beta$. The predetermined deceleration acceleration $\beta$ is a value obtained by experiments or the like in advance so that the occupants of the vehicle do not feel a sense of discomfort due to sudden deceleration.

Instead of calculating the deceleration acceleration α and estimating whether or not the vehicle can stop, the calculation unit 130 may calculate an expected stop position when the vehicle decelerates at the predetermined deceleration acceleration β, and may estimate that the vehicle cannot stop before the stop line if the stop line is located between the expected stop position and the vehicle. Specifically, the calculation unit 130 may calculate a predetermined distance DH which the vehicle moves until the vehicle stops by decelerating at the predetermined deceleration acceleration β, by dividing the square of the current speed V of the vehicle by twice the predetermined deceleration acceleration β.

That is, the predetermined distance DH can be evaluated by the following equation (2).

$$DH = V^2 / 2\beta \tag{2}$$

Then, the calculation unit 130 may set a position advanced by the predetermined distance DH from the current position of the vehicle in the traveling direction of the vehicle as the expected stop position, and may estimate that the vehicle cannot be stopped in front of the stop line in a case where the stop line is located between the expected stop position and the vehicle. That is, in a case where the expected stop position is farther than the stop line along the traveling direction of the vehicle when viewed from the vehicle, the calculation unit 130 may estimate that the vehicle cannot stop before the stop line.

The calculation unit 130 selects, among the traffic signals extracted by the stop position acquisition unit 120, the traffic signal corresponding to the stop line at which it is estimated that the vehicle cannot stop in front of the vehicle, as a traffic signal (target traffic signal) to be determined.

Figure 3:
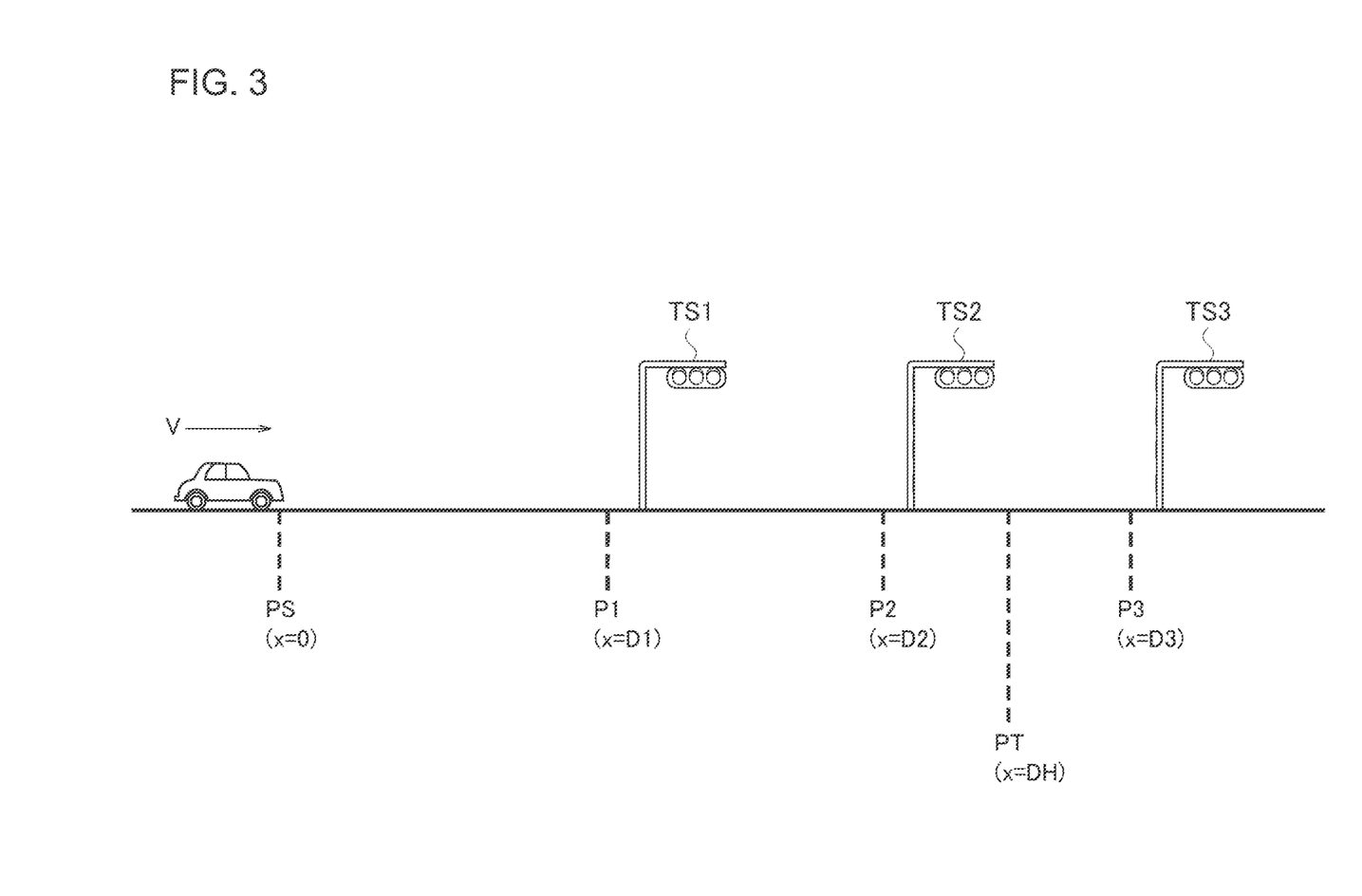
FIG. 3 is a schematic view showing an example of the positional relationship between the vehicle and the plurality of traffic signals.

The selection of the target traffic signal will be described with reference to FIG. 3. FIG. 3 is a schematic view showing an example of the positional relationship between the vehicle and the plurality of traffic signals. In FIG. 3, it is shown that a vehicle traveling at a speed V is located at a position PS (coordinates x=0), a traffic signal TS1, a traffic signal TS2, and a traffic signal TS3 exist in the traveling direction of the vehicle, and the stop lines corresponding to each of the above traffic signals TS1, TS2, TS3 are at the position P1 (coordinates x=D1), the position P2 (coordinates x=D2), and the position P3 (coordinates x=D3).

Here, it is assumed that the expected stop position is set in the position PT based on the predetermined distance DH calculated by the above equation (2). In this case, even if the vehicle decelerates at the predetermined deceleration acceleration β, it means that the vehicle cannot stop before the stop line at position P1 and the stop line at position P2. This is because the stop line at position P1 and the stop line at position P2 exist in the section between the expected stop position at position PT and the vehicle at position PS.

Therefore, the calculation unit 130 selects the traffic signal TS1 corresponding to the stop line at the position P1 and the traffic signal TS2 corresponding to the stop line at the position P2 as the target traffic signals. On the other hand, the traffic signal TS3 corresponding to the stop line at position P3 is not selected as the target traffic signal.

According to the equation (1), since the deceleration acceleration a and the distance D are in an inversely proportional relationship, it can be seen that the magnitude of the deceleration acceleration required to stop at the stop line at the position P1 or the stop line at the position P2 is larger than the magnitude of the predetermined deceleration acceleration β. This is because the distance D1 and the distance D2 are shorter than the predetermined distance DH. Therefore, the target traffic signal selected in a case where the calculation unit 130 calculates the deceleration acceleration α and estimates whether or not the vehicle can be stopped matches the target traffic signal selected in a case where the calculation unit 130 estimates whether or not the vehicle can be stopped based on the positional relationship between the stop line and the expected stop position.

The detection area setting unit 140 sets a detection area corresponding to the target traffic signal on the image captured by the imaging unit 71. Here, the "detection area" means an area in which the target traffic signal is estimated to be present in the image, and is the target range of image processing by the determination unit 150 described later. The position of the traffic signal reflected in imaging range in the image can be estimated based on the imaging direction of the imaging unit 71, the position and orientation of the vehicle at the time of imaging, and the position of the traffic signal. The detection area setting unit 140 sets, for example, a part of the captured image, which includes the estimated position of the traffic signal in the image, as the detection area.

Figure 4:
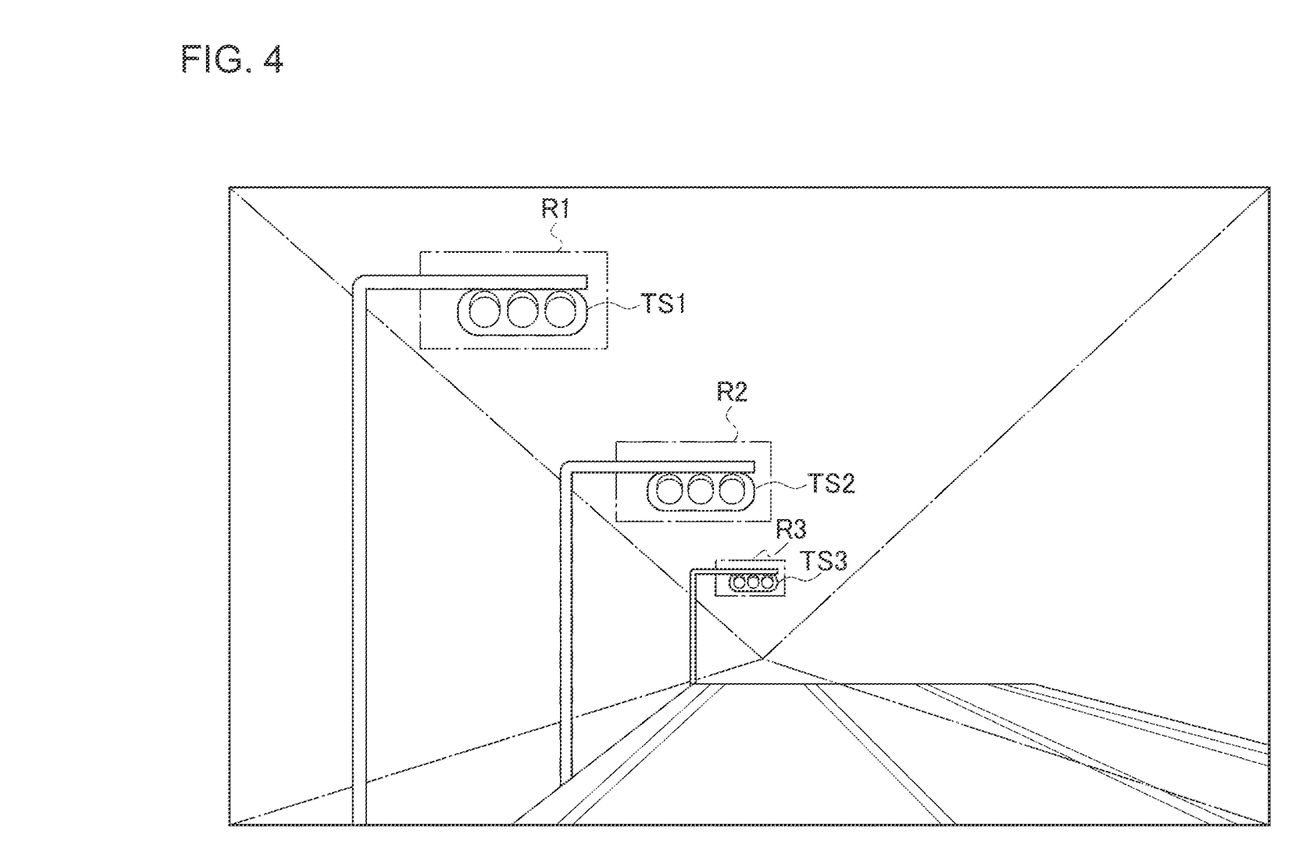
FIG. 4 is a schematic diagram showing an example of setting a detection area on a captured image.

The setting of the detection area will be described with reference to FIG. 4. FIG. 4 is a schematic diagram showing an example of setting a detection area on the captured image. FIG. 4 shows how the detection area R1, the detection area R2, and the detection area R3 are set corresponding to the traffic signal TS1, the traffic signal TS2, and the traffic signal TS3, respectively.

When the traffic signal TS1 and the traffic signal TS2 are selected as the target traffic signals and the traffic signal TS3 is not selected as the target traffic signal as shown in FIG. 3, the detection area R3 corresponding to the traffic signal TS3 is not set.

Since the detection area is not set on the image for the traffic signal corresponding to the stop line where the vehicle can decelerate at the predetermined deceleration acceleration and stop in front of, it is possible to reduce the computational load when determining the target traffic signal in the detection area and determining the display state of the target traffic signal.

In addition, since the detection area is surely set on the image for the traffic signal corresponding to the stop line where the vehicle cannot stop in front even if the vehicle decelerates at the predetermined deceleration acceleration, it is possible to reliably determine the display state with the traffic signal that needs to be detected as a detection target even if the distance between the intersections is relatively close. Therefore, it is possible to recognize the traffic signal that needs to be detected while suppressing the increase in the computational load.

The determination unit 150 executes image processing on the detection area, detects the target traffic signal in the detection area, and determines the display state of the target traffic signal. The determination unit 150 detects a traffic signal by, for example, template matching. In template matching, a standard traffic signal image is used as a template, and the detection area is scanned while shifting the image one pixel at a time, and for example, the correlation of the brightness distribution is calculated. Then, when the correlation becomes the highest value, it is detected that the traffic signal is at the position on the image where the template is located.

The "color signal" indicated by the traffic signal includes a "green signal", a "yellow signal", and a "red signal". The meaning of "color signal" is determined by the traffic regulations that the vehicle should follow. For example, "green signal" means "may proceed" and "red signal" means "stop at the stop position". The "yellow signal" means "stop at the stop position unless it is not possible to stop safely because it is close to the stop position".

Such discrimination of "green signal", "yellow signal", and "red signal" may be performed such that it is estimated that the "color signal" having the highest luminance level among the three "color signals" is lit.

In addition, the traffic signal may indicate not only a "color signal" but also an "arrow signal" indicating a direction permitted to the vehicle at an intersection where the traffic signal is installed. For example, the "arrow signal" is a "right turn signal", a "straight ahead signal", and/or a "left turn signal".

The "arrow signal" is not limited to the "right turn signal", "straight ahead signal", and "left turn signal", and various variations can be considered depending on the structure of the intersection where the traffic signal is installed. The meaning of the "arrow signal" is determined by the traffic regulations that the vehicle should obey.

The determination unit 150 executes image processing on the detection area and determines a lighting state of the "color signal" and the "arrow signal" of the traffic signal as the display state of the traffic signal.

The image processing of the traffic signal detection by the determination unit 150 may use machine learning such as a support vector machine or a neural network. When detecting a traffic signal, the recognition rate can be improved by preparing a learning database in which templates of traffic signals of different sizes are stored in advance and using the learning database to be referred to according to the distance to the traffic signal.

The output unit 160 outputs the display state of the target traffic signal determined by the determination unit 150. For example, the display state of the target traffic signal is output from the output unit 160 to the vehicle control device 400 and used for controlling the vehicle. In addition, the display state of the target traffic signal may be output from the output unit 160 to a notification device (not shown) and notified to the occupant via the notification device.

[Processing Procedure of Traffic Signal Recognition Device]

Next, a traffic signal recognition processing procedure by the traffic signal recognition device according to the present embodiment will be described with reference to the flowchart of FIG. 2. The traffic signal recognition process shown in FIG. 2 may be executed every time the imaging unit 71 acquires an image, or may be executed every cycle the image processing is executed on the detection area after the imaging unit 71 acquires the image.

In step S101, the self-position acquisition unit 110 acquires the absolute position of the vehicle via the in-vehicle sensor 73.

In step S103, the stop position acquisition unit 120 searches for the map information acquired by the map information acquisition unit 75, and extracts a traffic signal located in the traveling direction of the vehicle.

In step S105, the stop position acquisition unit 120 acquires the position of the stop line corresponding to the extracted traffic signal from the map information.

In step S107, the calculation unit 130 calculates a selection condition for selecting a target traffic signal from the extracted traffic signals. Specifically, in a case of estimating whether or not the vehicle can decelerate at a predetermined deceleration acceleration and stop before the stop line, the calculation unit 130 calculates the magnitude of the deceleration acceleration α in a case where the vehicle stops at the stop line. Further, in a case of estimating whether or not the vehicle can be stopped based on the positional relationship between the stop line and the expected stop position, the calculation unit 130 calculates a predetermined distance DH in which the vehicle decelerates at a predetermined deceleration acceleration β and moves until the vehicle stops.

In step S109, the calculation unit 130 selects a target traffic signal from the extracted traffic signals using the calculated selection conditions. In the following, it will be described assuming that N target traffic signals are selected.

For example, if the calculated magnitude of the deceleration acceleration α is larger than the magnitude of the predetermined deceleration acceleration β, the calculation unit 130 estimates that the vehicle cannot stop before the stop line when the vehicle decelerates at the predetermined deceleration acceleration β, and selects a traffic signal corresponding to the stop line as the target traffic signal. In addition, the calculation unit 130 may select a traffic signal corresponding to a stop line as the target traffic signal, wherein the distance D between the vehicle and the stop line is smaller than the calculated predetermined distance DH.

In step S111, the detection area setting unit 140 sets the detection area corresponding to the target traffic signal on the image captured by the imaging unit 71.

In step S121, the determination unit 150 sets the variable i to 1.

In step S123, the determination unit 150 determines the display state of the target traffic signal (i-th target traffic signal) closest to the vehicle among the N target traffic signals. Specifically, image processing is executed on the detection area corresponding to the i-th target traffic signal closest to the vehicle, and the determination unit 150 determines the display state of the target traffic signal.

In step S125, the determination unit 150 checks the variable i and determines whether or not "i=N" is satisfied, and if "i=N" is satisfied (YES in step S125), proceeds to step S131.

If "i=N" is not satisfied in step S125 (NO in step S125), in step S127, the determination unit 150 determines whether or not it is possible to go straight on the stop line (it is possible to go straight) corresponding to the i-th target traffic signal based on the display state of the i-th target traffic signal.

The determination unit 150 may determine whether or not the vehicle can go straight based on the travel plan of the vehicle instead of based on the display state of the target traffic signal. Specifically, based on the vehicle's travel plan, if the vehicle does not go straight and turns left or right at an intersection located in front of the i-th target traffic signal, the vehicle will not pass through the stop line corresponding to the i-th target traffic signal. In this case, the determination unit 150 may determine that the vehicle cannot go straight at the i-th target traffic signal.

If it is determined that "the vehicle can go straight" in step S127 (YES in step S127), the process proceeds to step S129, and the determination unit 150 adds 1 to the variable i.

If it is determined that "the vehicle cannot go straight" in step S127 (NO in step S127), the process proceeds to step S131.

In step S131, the output unit 160 outputs the display state of the target traffic signal determined by the determination unit 150. The output display state of the target traffic signal is used, for example, in the vehicle control device 400.

Figure 2:
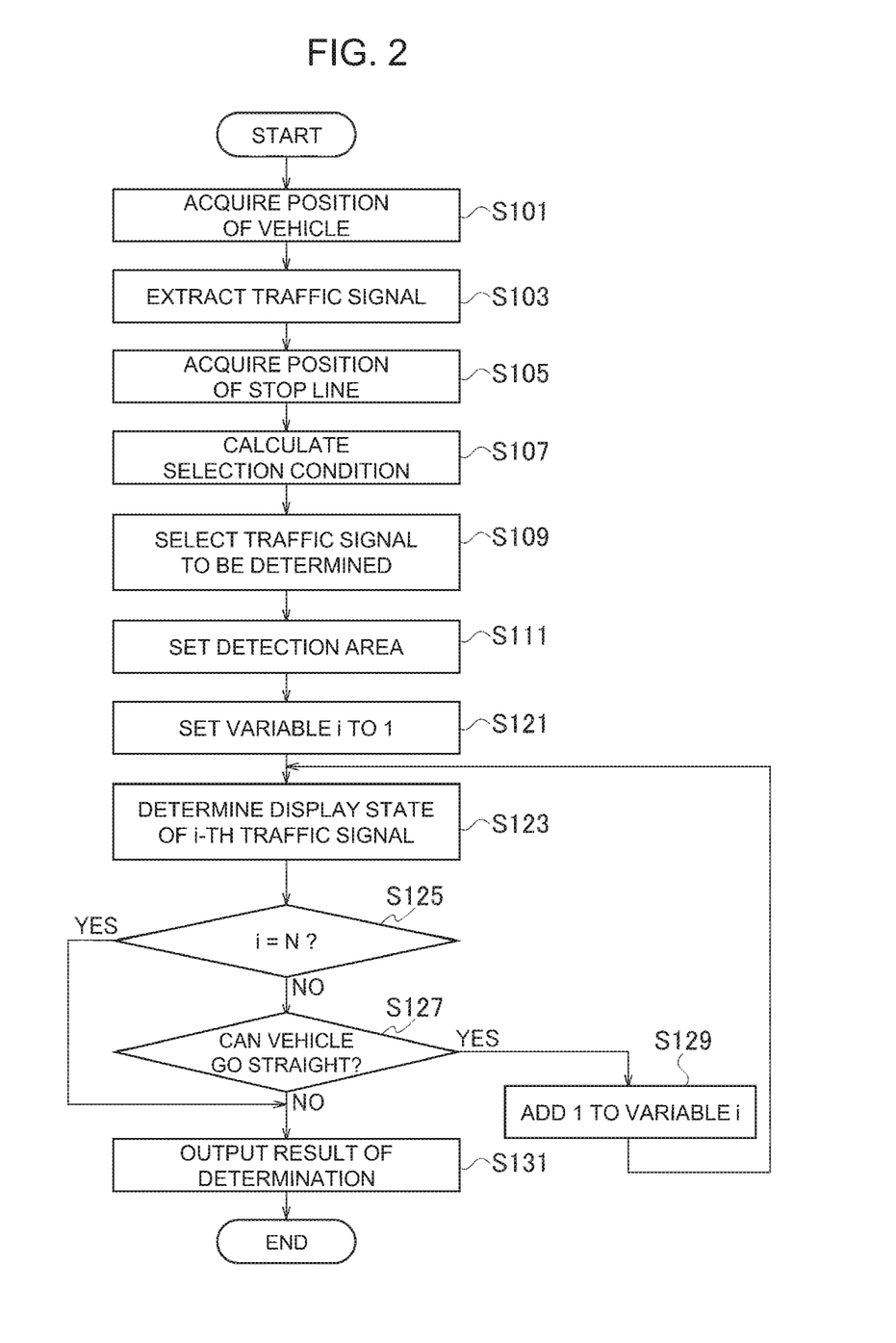
FIG. 2 is a flowchart illustrating a processing procedure of a traffic signal recognition device according to an embodiment of the present invention.

In the flowchart of FIG. 2, it is explained that the determination unit 150 determines whether or not "the vehicle can go straight" at the i-th target traffic signal based on the display state of the i-th target traffic signal after the detection area setting unit 140 sets the detection area corresponding to the target traffic signal on the image. It is explained that the determination unit 150 does not determine whether or not "the vehicle can go straight" at the display state for the (i+1)-th and subsequent target traffic signals in a case where it is determined that "the vehicle cannot go straight" at the i-th target traffic signal.

However, this embodiment is not limited to the example shown in the flowchart of FIG. 2. For example, after setting the detection area from the first to the i-th target traffic signal among the N target traffic signals, it may be determined whether or not "the vehicle can go straight" based on the display state of the i-th target traffic signal, and in the case where it is determined that "the vehicle cannot go straight" at the i-th target traffic signal, the detection area corresponding to the (i+1)-th and subsequent target traffic signals may not be set. Since the number of detection areas set on the image can be reduced, the computational load on the detection area setting unit 140 and the determination unit 150 can be reduced.

In addition, the detection area setting unit 140 may set the detection area corresponding to the target traffic signal on the image when the vehicle is accelerating or moving at a constant velocity, and may not set the detection area corresponding to the target traffic signal on the image when the vehicle is decelerating. When the vehicle is decelerating, it is assumed that the vehicle will stop at the stop line closest to the vehicle, and it is considered that there is little need to consider a traffic signal corresponding to a stop line distant from the vehicle. Therefore, when the vehicle is decelerating, the computational load can be reduced by not setting the detection area corresponding to the target traffic signal.

Effect of Embodiments

According to the present invention, a traffic signal recognition method and a traffic signal recognition device according to the present embodiment capture an image of a traveling direction of a vehicle by using an imaging unit mounted on the vehicle, acquire a position of a stop line corresponding to a traffic signal located in the traveling direction of the vehicle, estimate whether or not the vehicle can be decelerated at a predetermined deceleration acceleration and can stop before the stop line based on the position of the stop line, select the traffic signal corresponding to the stop line as a target traffic signal in a case where it is estimated that the vehicle cannot stop before the stop line, set a detection area corresponding to the target traffic signal on the image, and determine a display state of the target traffic signal by executing image processing on the detection area.

As a result, it is possible to determine the display state of the target traffic signal corresponding to the stop line at which the vehicle cannot be stopped even if the vehicle decelerates at the predetermined deceleration acceleration, and it is possible to safely decelerate and/or stop the vehicle by outputting the display state.

In particular, the detection area is surely set on the image for the traffic signal corresponding to the stop line which the vehicle cannot stop in front of even if the vehicle decelerates at the predetermined deceleration acceleration, and thus, it is possible to reliably determine the display state with the traffic signal that needs to be detected as a detection target, even if the distance between intersections is relatively close. As a result, the safety of the vehicle can be improved.

On the other hand, since the detection area is not set on the image for the traffic signal corresponding to the stop line which the vehicle can stop in front of by decelerating at the predetermined deceleration acceleration, it is possible to reduce the computational load when detecting the target traffic signal in the detection area and determining the display state of the target traffic signal.

Therefore, it is possible to recognize the traffic signal that needs to be detected while suppressing the increase in the computational load.

Further, a traffic signal recognition method and a traffic signal recognition device according to the present embodiment may calculate a deceleration acceleration for the vehicle to stop at the stop line, and may estimate that the vehicle cannot stop before the stop line in a case where magnitude of the deceleration acceleration is larger than magnitude of the predetermined deceleration acceleration. As a result, the target traffic signal can be reliably selected with reference to the predetermined deceleration acceleration.

Furthermore, a traffic signal recognition method and a traffic signal recognition device according to the present embodiment may calculate an expected stop position when the vehicle decelerates at the predetermined deceleration acceleration, and may estimate that the vehicle cannot stop before the stop line if the stop line is located between the expected stop position and the vehicle. As a result, the target traffic signal can be reliably selected with reference to the expected stop position determined based on the predetermined deceleration acceleration.

Further, a traffic signal recognition method and a traffic signal recognition device according to the present embodiment may acquire the position of the stop line corresponding to the traffic signal based on the position of the vehicle and a map information, wherein the map information includes information on the position of the traffic signal. As a result, the target traffic signal can be reliably selected based on the position of the traffic signal included in the map information.

Furthermore, a traffic signal recognition method and a traffic signal recognition device according to the present embodiment may set the detection area corresponding to the target traffic signal on the image if all the traffic signals between the stop line corresponding to the target traffic signal and the vehicle indicate that the vehicle can go straight on a planned travel route of the vehicle. As a result, the number of detection areas set on the image can be reduced, so that the computational load can be reduced.

Further, a traffic signal recognition method and a traffic signal recognition device according to the present embodiment may acquire an acceleration of the vehicle and may set the detection area corresponding to the target traffic signal on the image in a case where the vehicle is accelerating or moving at a constant velocity. As a result, in a scene where it is necessary to determine not only a display state of a traffic signal near the vehicle but also a display state of a traffic signal distant from the vehicle, the traffic signal that needs to be detected can be selected as the target traffic signal and it is possible to perform determining the display state of the traffic signal that needs to be detected. As a result, the safety of the vehicle can be improved. On the other hand, when the vehicle is decelerating, the computational load can be reduced by not setting the detection area corresponding to the target traffic signal.

Furthermore, a traffic signal recognition method and a traffic signal recognition device according to the present embodiment may acquire a position of the vehicle, a speed of the vehicle, and the position of the stop line for each cycle of executing the image processing, and estimate whether or not the vehicle can stop before the stop line. A computational load related to image processing tends to be larger than a computational load for acquiring the position of the vehicle, the speed of the vehicle, and the position of the stop line, and a computational load for estimating the stop of the vehicle before the stop line. Thus, it is possible to prevent the other processing from being delayed while waiting for the image processing by performing other processing every cycle in which the image processing is executed.

Further, a traffic signal recognition method and a traffic signal recognition device according to the present embodiment may estimate whether or not the vehicle can stop before the stop line by decelerating the vehicle at the predetermined deceleration acceleration in a case all the traffic signals between the stop line and the vehicle indicate that the vehicle can go straight on a planned travel route of the vehicle. As a result, the number of estimations for stopping the vehicle before the stop line can be reduced, and the computational load can be reduced.

Respective functions described in the above embodiment may be implemented by one or plural processing circuits. The processing circuits include programmed processing devices such as a processing device including an electric circuit and include devices such as an application specific integrated circuit (ASIC) and conventional circuit elements that are arranged to execute the functions described in the embodiment.

Although the contents of the present invention have been described above with reference to the embodiment, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

REFERENCE SIGNS LIST 71 imaging unit
73 in-vehicle sensor
75 map information acquisition unit
100 controller
110 self-position acquisition unit
120 stop position acquisition unit
130 calculation unit
140 detection area setting unit
150 determination unit
160 output unit
400 vehicle control device

The invention claimed is:

1. A traffic signal recognition method comprising:
capturing an image of a traveling direction of a vehicle by using an imaging unit mounted on the vehicle;
acquiring a position of a stop line corresponding to a traffic signal located in the traveling direction of the vehicle;
estimating whether or not the vehicle can be decelerated at a predetermined deceleration and can stop before the stop line based on the acquired position of the stop line;
selecting the traffic signal corresponding to the acquired position of the stop line as a target traffic signal when an estimation is made that the vehicle cannot stop before the stop line;
setting a detection area corresponding to an area where the target traffic signal is estimated to be present on the image; and
determining a display state of the target traffic signal by executing image processing on the detection area,
wherein the detection area does not include an area of the image corresponding to another traffic signal located in the traveling direction of the vehicle that the vehicle can stop before at the predetermined deceleration.

2. The traffic signal recognition method according to claim 1, further comprising:
calculating a deceleration for the vehicle to stop at the stop line, and
estimating that the vehicle cannot stop before the stop line in a case where magnitude of the calculated deceleration is larger than magnitude of the predetermined deceleration.

3. The traffic signal recognition method according to claim 1, further comprising:
calculating an expected stop position when the vehicle decelerates at the predetermined deceleration, and
estimating that the vehicle cannot stop before the stop line if the stop line is located between the expected stop position and the vehicle.

4. The traffic signal recognition method according to claim 1, further comprising:
acquiring the position of the stop line corresponding to the traffic signal based on a position of the vehicle and a map information,
wherein the map information includes information on the position of the traffic signal.

5. The traffic signal recognition method according to claim 1, further comprising:
setting the detection area corresponding to the target traffic signal on the image if all traffic signals between the stop line corresponding to the target traffic signal and the vehicle indicate that the vehicle can go straight on a planned travel route of the vehicle.

6. The traffic signal recognition method according to claim 1, further comprising:
acquiring an acceleration of the vehicle and
setting the detection area corresponding to the target traffic signal on the image in a case where the vehicle is accelerating or moving at a constant velocity.

7. The traffic signal recognition method according to claim 1, further comprising:
acquiring a position of the vehicle, a speed of the vehicle, and the position of the stop line for each cycle of executing the image processing, and
estimating whether or not the vehicle can stop before the stop line.

8. The traffic signal recognition method according to claim 1, further comprising:
estimating whether or not the vehicle can stop before the stop line by decelerating the vehicle at the predetermined deceleration in a case all traffic signals between the stop line and the vehicle indicate that the vehicle can go straight on a planned travel route of the vehicle.

9. A traffic signal recognition device comprising:
an imaging unit mounted on a vehicle and a controller, wherein the controller is configured to:
capture an image of a traveling direction of a vehicle by using the imaging unit;

acquire a position of a stop line corresponding to a traffic signal located in the traveling direction of the vehicle;

estimate whether or not the vehicle can be decelerated at a predetermined deceleration and can stop before the stop line based on the acquired position of the stop line;

select the traffic signal corresponding to the acquired position of the stop line as a target traffic signal when an estimation is made that the vehicle cannot stop before the stop line;

set a detection area corresponding to an area where the target traffic signal is estimated to be present on the image; and determine a display state of the target traffic signal by executing image processing on the detection area, wherein the detection area does not include an area of the image corresponding to another traffic signal located in the traveling direction of the vehicle that the vehicle can stop before at the predetermined deceleration.

10. The traffic signal recognition method according to claim 1, wherein acquiring the position of the stop line corresponding to the traffic signal located in the traveling direction of the vehicle comprises:

acquiring, from map information, the position of the stop line corresponding to the traffic signal located in the traveling direction of the vehicle.

11. A traffic signal recognition device comprising:

an imaging unit mounted on a vehicle and a controller, wherein the controller is configured to:

capture an image of a traveling direction of a vehicle by using the imaging unit;

acquire, from map information, a position of a stop line corresponding to a traffic signal located in the traveling direction of the vehicle;

estimate whether or not the vehicle can be decelerated at a predetermined deceleration and can stop before the acquired position of the stop line corresponding to the traffic signal;

when an estimate is made that the vehicle cannot stop before the acquired position of the stop line corresponding to the traffic signal, limit a detection area of the image to comprise at least an area where the traffic signal corresponding to the stop line is estimated to be present in the captured image; and determine a display state of the traffic signal by executing image processing on the detection area, wherein the detection area does not include an area of the captured image corresponding to another traffic signal located in the traveling direction of the vehicle that the vehicle can stop before at the predetermined deceleration.

12. The traffic signal recognition device according to claim 11, wherein the detection area is less than the area of the captured image.

13. The traffic signal recognition device according to claim 11, wherein the detection area is less than half of the area of the captured image.

* * * * *